Nov. 8, 1938.                H. L. BONE                2,135,741
                          RAILWAY BOOTLEG
                Filed Feb. 4, 1936           7 Sheets-Sheet 2

INVENTOR
Herbert L. Bone.
BY
HIS ATTORNEY

Nov. 8, 1938.  H. L. BONE  2,135,741
RAILWAY BOOTLEG
Filed Feb. 4, 1936  7 Sheets-Sheet 3

INVENTOR
Herbert L. Bone.
BY
HIS ATTORNEY

Nov. 8, 1938.  H. L. BONE  2,135,741
RAILWAY BOOTLEG
Filed Feb. 4, 1936  7 Sheets-Sheet 4

INVENTOR
Herbert L. Bone.
BY
HIS ATTORNEY

Nov. 8, 1938.                H. L. BONE                    2,135,741
                          RAILWAY BOOTLEG
                         Filed Feb. 4, 1936          7 Sheets-Sheet 6

INVENTOR
Herbert L. Bone.
BY
HIS ATTORNEY

Nov. 8, 1938.   H. L. BONE   2,135,741
RAILWAY BOOTLEG
Filed Feb. 4, 1936   7 Sheets-Sheet 7

INVENTOR
Herbert L. Bone
BY
HIS ATTORNEY

Patented Nov. 8, 1938

2,135,741

UNITED STATES PATENT OFFICE 2,135,741

RAILWAY BOOTLEG

Herbert L. Bone, Pittsburgh, Pa., assignor to The Union Switch & Signal Company, Swissvale, Pa., a corporation of Pennsylvania Application February 4, 1936, Serial No. 62,328

10 Claims. (Cl. 247—1)

My invention relates to railway bootlegs, that is, to devices for connecting electrical conductors with the track rails of a railway.

I will describe seven forms of bootlegs embodying my invention, and will then point out the novel features thereof in claims.

In the accompanying drawings, Fig. 6b is a top plan view of the bootleg as shown in Fig. 6a. Fig. 7b is a top plan view of the bootleg as shown in Fig. 7a.

Similar reference characters refer to similar parts in each of the several views.

Figures 1, 1A, 1B:
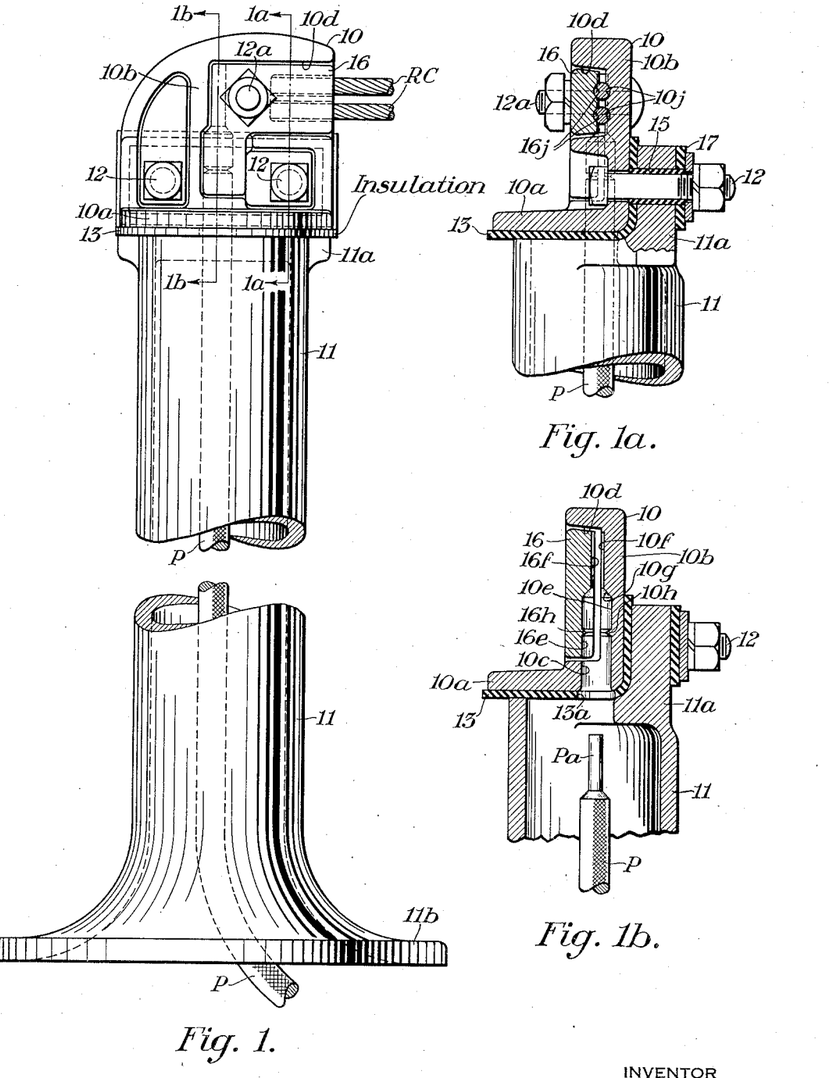
Fig. 1 is a side elevational view showing one form of bootleg embodying my invention.
Figs 1a and 1b are sectional views taken on the lines 1a—1a and 1b—1b, respectively, of Fig. 1.

Referring first to Figs. 1, 1a, and 1b, the bootleg in the form here shown comprises a suitable housing such as a pipe 11, the lower end of which, when the bootleg is in service, will be embedded in the ground, and the upper end of which will project above the surface of the ground. The lower end of the pipe 11 is provided with an integral bell-shaped flange 11b by means of which the pipe 11 may be securely anchored in place. An electrical conductor, here shown as an insulated wire P, is brought up from the ground through the pipe 11, and the flange 11b, in addition to serving as a means for anchoring the pipe 11 in place, also serves to prevent the formation of a sharp bend in the wire P at the point where the wire enters the pipe.

The bootleg also comprises a head assembly consisting of a pair of clamping members 10 and 16 which are secured together by a bolt 12a. The clamping member 10 is an irregularly-shaped casting or forging, preferably of malleable material, having a horizontally disposed semi-circular lower portion 10a and a vertically disposed upper portion 10b. The one side of the upper portion 10b is made straight, but the top and other side of the upper portion 10b is curved to prevent damage to the bootleg due to dragging railway equipment. The clamping member 10 is secured, by means of bolts 12, to an upstanding lug 11a which will usually be formed integral with the pipe 11 in the manner shown, but which may, if desired, be formed separate from the pipe and welded or otherwise secured thereto. Interposed between the clamping member 10 and the adjacent portions of the pipe and the lug 11a is a substantially L-shaped member 13 of suitable insulating material, such for example as fiber, which insulating member insulates the head assembly from the pipe and from the lug 11a. Each of the bolts 12 is insulated from the lug 11a by means of a sleeve 15 of insulating material and by a cooperating washer 17 which is also of insulating material (see Fig. 1a).

The insulated wire P extends upwardly through a hole 13a provided in the horizontal portion of the insulating member 13 and through an aligned hole 10c provided in the horizontal portion 10a of the member 10, and is securely clamped at its upper end between the two clamping members 10 and 16 in a manner which will be described more fully hereinafter. The clamping member 16 is substantially L-shaped, as will be apparent from an inspection of Fig. 1, and is disposed within a similarly shaped recess 10d formed in the vertical portion 10b of the clamping member 10, the parts being so proportioned that, when the bolt 12a is tightened in the intended manner, the outer side of the clamping member 16 will lie substantially flush with the adjacent outer side of the vertical portion 10b of the clamping member 10. The recess 10d is provided in the bottom thereof with a vertically disposed substantially semicircular groove 10e which forms a continuation of the hole 10c, and with an axially aligned substantially semicircular groove 10f, the lower end of which merges into the tapered upper end 10g of the groove 10e. The groove 10e has approximately the same diameter as, and receives a portion of, the upper end of the wire P from which the insulation has not been removed, while the groove 10f has substantially the same diameter as, and receives a portion Pa of the upper end of the wire P from which the insulation has been removed. The clamping member 16 is provided with axially aligned substantially semicircular grooves 16e and 16f which are similar to, and which mate with the grooves 10e and 10f in the clamping member 10. Formed in the grooves 10e and 16e are mating ribs 10h and 16h, respectively, which ribs partly close the associated grooves, and which when the bolt 12a is tightened become embedded in the insulation of the wire P, thereby holding the wire firmly in place for a distance below the exposed portion Pa, and in this manner reducing the danger of breakage of the wire at the point of its connection with the bootleg head.

The clamping members 10 and 16 are also provided with horizontally extending vertically spaced mating grooves 10j and 16j, which receive the two stranded wires of a rail connector RC, whereby the head assembly, and hence the wire P may be electrically connected with a track rail. The grooves 10j and 16j are curved in cross section as shown in Fig. 1a, and are of such depths that when the bolt 12a is tightened the clamping members 10 and 16 will simultaneously grip the exposed portion Pa of the wire P, the insulated portion of the wire P below the exposed portion and the two wires of the rail connector, in a manner to provide good mechanical and electrical connection between the wires and the head assembly.

Figures 2, 2A:
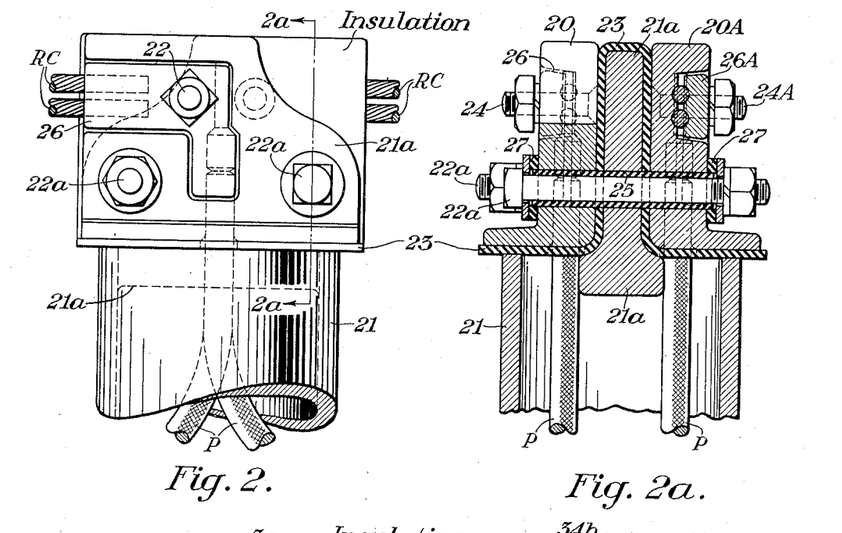
Fig. 2 is a side elevational view showing a second form of bootleg embodying my invention.
Fig. 2a is a sectional view taken on the line 2a—2a of Fig. 2.

Referring now to Figs. 2 and 2a, the modified form of bootleg here shown comprises a pipe 21 which is somewhat larger in diameter than the pipe 11, and which is provided at its upper end with a head assembly comprising a first pair of clamping members 20 and 26 which are similar to the clamping members 10 and 16, respectively, shown in Fig. 1, and with a second pair of clamping members 20A and 26A which are also similar to the clamping members 10 and 16, respectively. The clamping members 20 and 20A are secured, by means of a pair of bolts 22a, to the opposite sides of a centrally disposed vertically extending lug 21a which is formed integral with the upper end of the pipe 21, the clamping members being insulated from the lug and from the upper end of the pipe by means of an insulating member 23, and from the bolts 22a by means of insulating sleeves 25 and insulating washers 27. The clamping members 26 and 26A are each secured to the associated clamping members 20 and 20A by means of bolts 24 and 24A having countersunk heads which fit in countersunk holes in the members 26 and 26A. The two clamping members of each pair are provided with mating grooves for the reception of a wire P and the two wires of a rail connector RC in the same manner that the clamping members 10 and 16 shown in Fig. 1 are provided with mating grooves for the reception of the wire P and the two wires of a rail connector RC, and it will be apparent, therefore, without further detailed description that the bootleg shown in Figs. 2 and 2a provides a means for separately connecting each of two separate wires P with two separate rails, or with the same rail, by means of two separate rail connectors, as conditions may require.

Figures 3, 3A, 3B:
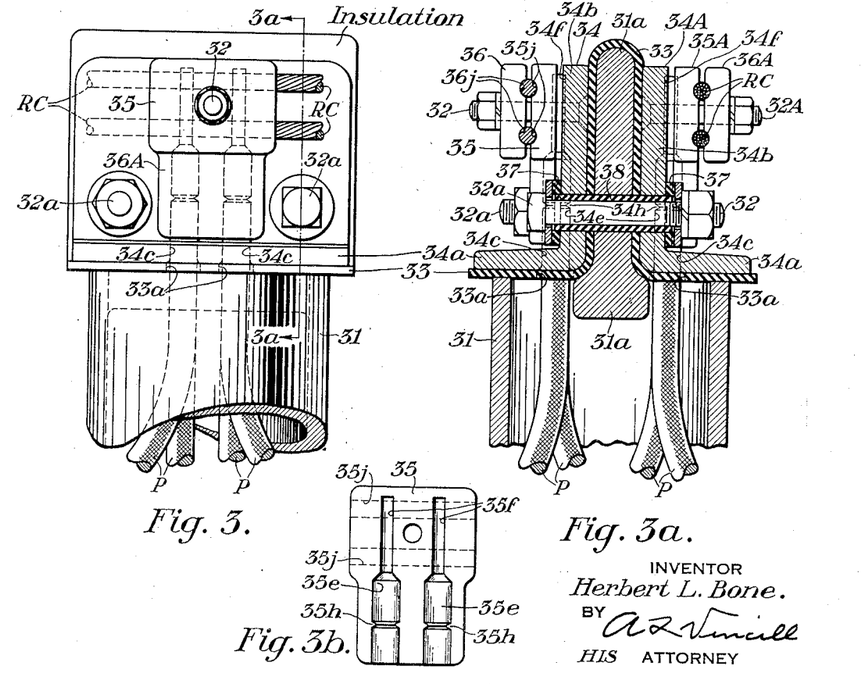
Fig. 3 is a side elevational view showing a third form of bootleg embodying my invention.
Fig. 3a is a sectional view taken on the line 3a—3a of Fig. 3.
Fig. 3b is a rear elevational view of the member 35 appearing in front elevation in Fig. 3.

Referring now to Figs. 3 and 3a, the bootleg here shown comprises a pipe 31 similar to the pipe 21 provided at its upper end with a head assembly, the construction of which is such that a pair of wires P may be connected with each rail connector RC instead of only one wire. The head assembly in the form illustrated in Figs. 3 and 3a comprises a first group of clamping members 34, 35, and 36 secured together by a bolt 32 having a countersunk head, and a second group of clamping members 34A, 35A, and 36A secured together by a bolt 32A which also has a countersunk head. The two clamping members 34 and 34A are similar, and each comprises a horizontally extending semicircular lower portion 34a and a vertically extending substantially rectangular upper portion 34b. The two clamping members 34 and 34A are secured to the opposite sides of a centrally disposed lug 31a which is formed on the upper end of the pipe 31, by means of a pair of bolts 32a, in such manner that these clamping members completely close the upper end of the pipe, and interposed between these clamping members and the adjacent portions of the lug 31a and the pipe is a molded insulating member 33 which insulates the clamping members from each other and from the pipe. The bolts 32a are each insulated from the clamping members 34 and 34A and from the lug 31a by means of an associated insulating tube 38 and a pair of insulating washers 37, in the manner shown in Fig. 3a. The lower portion 34a of each clamping member 34 is provided with a pair of spaced holes 34c which align with holes 33a in the adjacent horizontal portion of the insulating member 33, and the upper portion 34b of each clamping member 34 and 34A is provided with two vertically extending grooves 34e, each of which forms a continuation of one of the holes 34c, and with other vertically extending grooves 34f, each of which aligns axially with, and forms a continuation of, one of the grooves 34e. Each groove 34e is partly closed by a rib 34h, the grooves 34e and 34f and the rib 34h all being similar to the corresponding grooves 10e and 10f and the rib 10h which are formed in the clamping member 10 shown in Fig. 1.

The two clamping members 35 and 35A are likewise similar, and each is provided on its inner face with two pairs of vertically extending grooves 35e and 35f (see the clamping member 35 shown in Fig. 3b) which are similar to the grooves 16e and 16f formed on the inner face of the clamping member 16 shown in Fig. 1, and which mate with the grooves 34e and 34f formed in the associated clamping member 34 or 34A. Each of the clamping members 35 and 35A is also provided in each groove 35f with a rib 35h which mates with the rib 34h formed in the groove 34e of the associated clamping member 34 or 34A. Each of the clamping members 35 and 35A is also provided on its outer face on opposite sides of the clamping bolt 32 with two horizontally disposed vertically spaced grooves 35j which mate with similar grooves 36j formed on the inner face of the adjacent clamping member 36 or 36A.

In utilizing the bootleg shown in Figs. 3 and 3a, a wire P is brought up out of the pipe 31 through each hole 33a in the insulating member 33 and the aligned hole 34c in the lower portion 34a of the two clamping members 34 and 34A, and is placed at its upper end in the mating grooves formed in the two clamping members 34 and 35 in a manner which will be readily understood from an inspection of the drawings and from the description of the preceding forms of the invention. The two wires of one rail connector RC are disposed in the mating grooves 35j and 36j in the clamping members 35 and 36, and the two wires of another rail connector RC are disposed in the mating grooves 35j and 36j in the two clamping members 35A and 36A. The bolts 32 and 32A are then tightened, thereby clamping the parts in place, and at the same time electrically connecting each rail connector with the associated pair of wires P.

Figure 4:
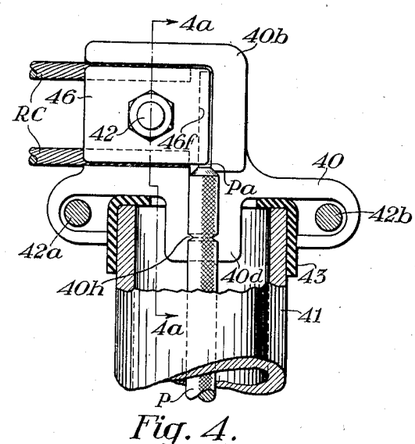
Fig. 4 is a view partly in side elevation and partly in section showing a fourth form of bootleg embodying my invention, certain of the parts being broken away or removed to better illustrate the construction of the remaining parts.
Figure 4A:
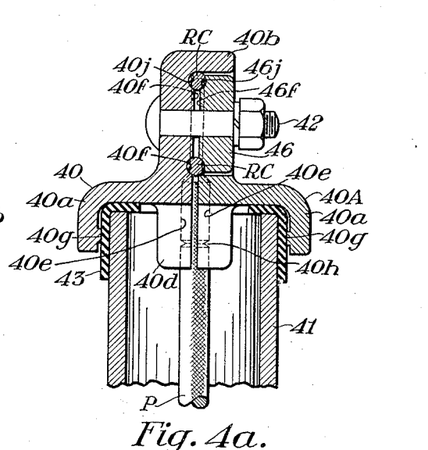
Fig. 4a is a sectional view taken on the line 4a—4a of Fig. 4.
Figure 4B:
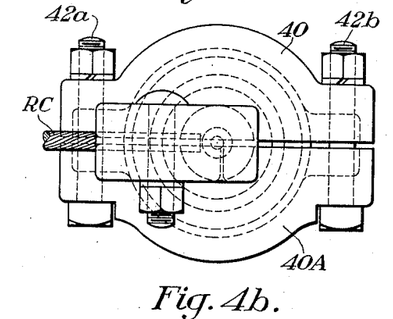
Fig. 4b is a top plan view of the bootleg shown in Fig. 4.

Referring now to Figs. 4, 4a, and 4b, the bootleg here shown consists of a pipe 41 the upper end of which is cut off square. The bootleg head assembly in this form of the invention comprises two clamping members 40 and 40A each provided at its lower end with a depending semicircular flange 40a, the inner face of which is provided with a rib 40g. The clamping members 40 and 40A are tightly clamped to the pipe 41 by means of a pair of bolts 42a and 42b, and together form a cap which completely closes the upper end of the pipe. An insulating member 43 comprising a cylindrical lower portion provided at its upper end with an annular inwardly extending flange, is disposed between the sides and top of the pipe and the adjacent portions of the clamping member, and when the two bolts 42a and 42b are tightened, the ribs 40g embed themselves into the cylindrical portion of the member 43, thereby insuring a tight fit between the bootleg head assembly and the pipe 41, and at the same time insulating the head assembly from the pipe.

A depending lug 40d is formed on each of the clamping members 40 and 40A on the inside of the pipe, and each of these lugs is provided with a curved vertically extending groove 40e which together with the groove 40e in the opposite lug forms a passageway through which the insulated wire P is brought out of the upper end of the pipe. The two grooves 40e are each partly closed by a rib 40h which becomes embedded in the insulation of the wire P, when the bolts 42a and 42b are tightened, to assist in holding the wire in place. The groove 40e in the lug 40d of the clamping member 40 extends some distance above the lug, and terminates at its upper end in an axially aligned groove 40f which is formed on the inner face of the clamping member 40, and which is of the proper size to receive the non-insulated portion Pa of the wire P. The non-insulated portion of the wire also cooperates with a groove 46f which is formed in the inner face of a third clamping member 46 which is bolted to the clamping member 40 by means of a bolt 42, whereby, when the bolt 42 is tightened, the non-insulated portion Pa of the wire is securely clamped between the two clamping members 40 and 46, thus insuring good electrical contact between the wire and the clamping members 40 and 46.

The clamping members 40 and 46 in addition to being provided with mating grooves 40f and 46f for the reception of the non-insulated portion Pa of the wire P are also formed with vertically spaced horizontally extending mating grooves 40j and 46j which receive the two wires of a rail connector RC in such manner that when the bolt 42 is tightened, these latter wires will also be mechanically and electrically connected with the two clamping members 40 and 46. It should be noted that the clamping member 46 is disposed within a recess formed in part by a laterally projecting flange 40b which is provided on the top and one side of the vertically extending upper portion of the clamping member 40, and in part by the clamping member 40A, whereby the direct entrance of water into the bootleg between the clamping members is prevented.

Figure 5:
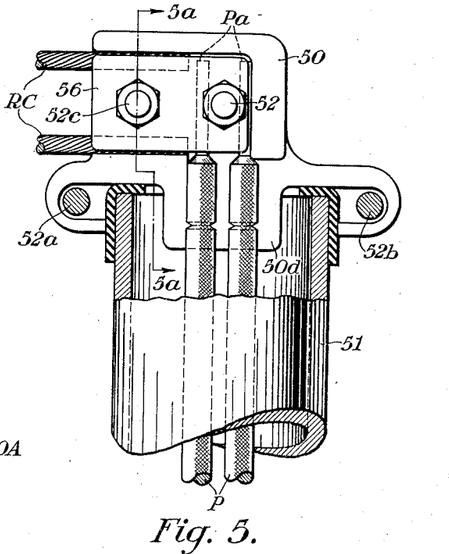
Fig. 5 is a view similar to Fig. 4 illustrating a modified form of the bootleg shown in Fig. 4.
Figure 5A:
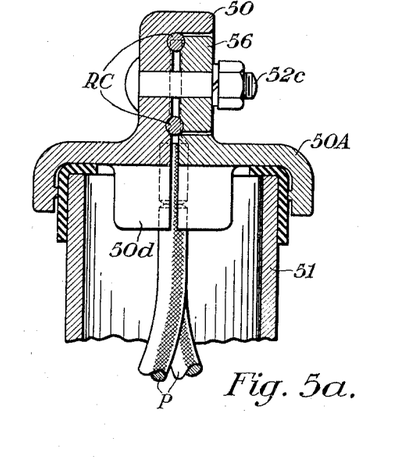
Fig. 5a is a sectional view taken on the line 5a—5a of Fig. 5.

Referring now to Figs. 5 and 5a, the bootleg here shown is similar to the bootleg shown in Figs. 4, 4a and 4b with the exception that the pipe, which is here designated 51, and the three clamping members, which are here designated 50, 50A, and 56, respectively, have been enlarged somewhat to enable two wires P to be connected with the rail connector RC, the various clamping members in each instance being provided with the proper grooves for the reception of the two wires P, and the two wires of the rail connector RC in the manner shown. Furthermore, to insure rigid gripping of the bare portions Pa of both wires P and of the two wires of the rail connector by the clamping member 56, two bolts 52 and 52c have been provided. All of the remaining parts of the bootleg shown in Figs. 5 and 5a are similar to the corresponding parts shown in Figs. 4, 4a and 4b, and it is believed, therefore, that further detailed description of the bootleg shown in Figs. 5 and 5a is unnecessary. It should be pointed out, however, that if desired, the clamping member 56 may be made in two pieces instead of one, the one piece being of the proper size and shape to grip the bare portions of the wire P when the bolt 52 is tightened, and the other piece being of the proper size and shape to grip the two wires of the rail connector RC when the bolt 52c is tightened.

Figures 6, 6A:
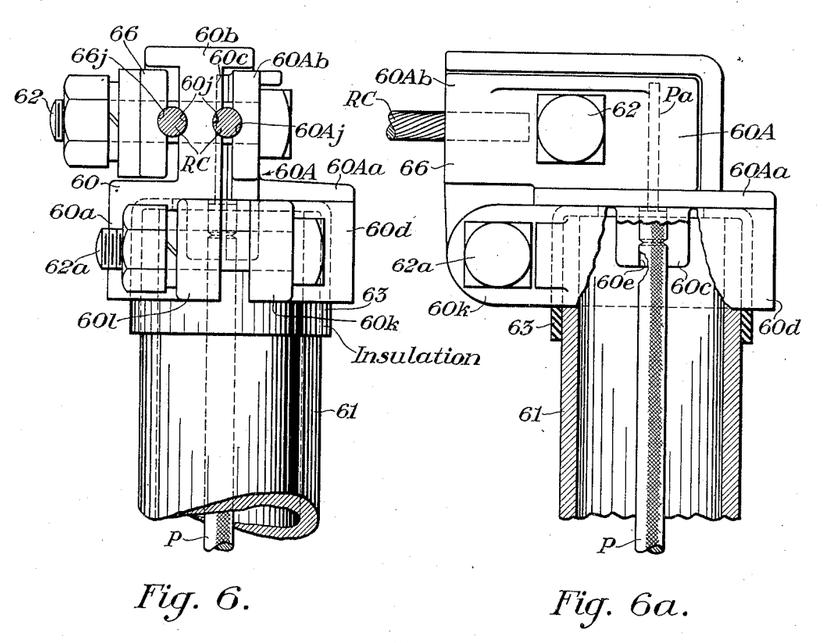
Fig. 6 is a front elevational view showing a sixth form of bootleg embodying my invention.
Fig. 6a is a view partly in section and partly in side elevation of the bootleg shown in Fig. 6.
Figure 6B:
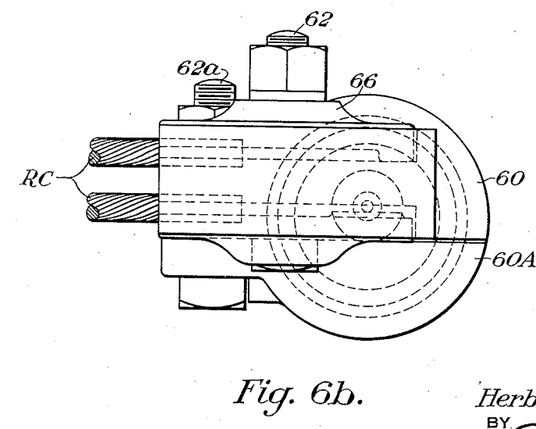
Figure 6C:
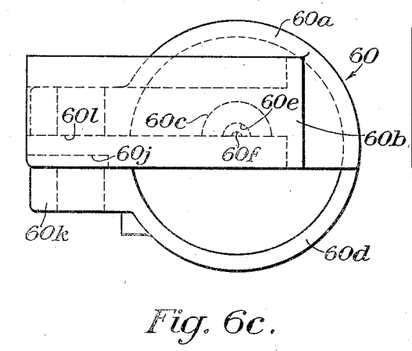
Fig. 6c is a top plan view of the clamping member 60 forming part of the bootleg shown in Figs. 6, 6a, and 6b.
Figure 6D:
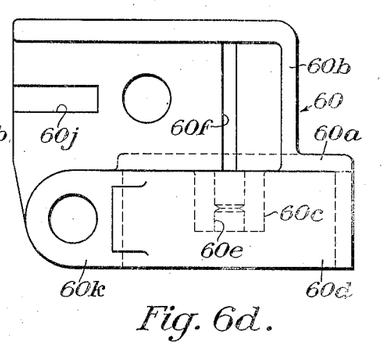
Figs. 6d and 6e are front and side elevational views of the member 60 shown in Fig. 6c.
Figure 6E:
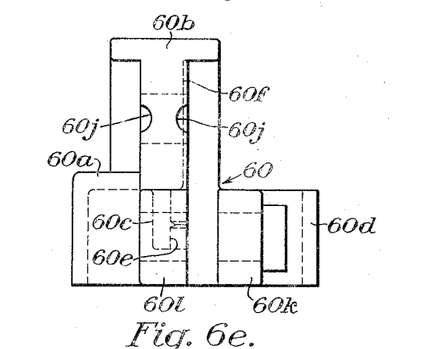

In the modified form of the invention shown in Figs. 6, 6a, and 6b, the bootleg comprises a pipe 61 similar to the pipe 41 shown in Fig. 4 provided at its upper end with a head assembly consisting of three clamping members 60, 60A, and 66. As best seen in Figs. 6c, 6d, and 6e, the clamping member 60 comprises a horizontal portion 60a which is adapted to close approximately one-half of the upper end of the pipe 61, an upwardly extending T-shaped portion 60b which is formed integrally with the horizontal portion 60a, a depending lug 60c which is also formed integrally with the horizontal portion 60a, and a split collar 60d which is likewise formed integrally with the horizontal portion 60a, and which is adapted to surround the upper end of the pipe 61. The two ends of the collar 60d are provided with lugs 60k and 60l which are apertured to receive a clamping bolt 62a, whereby the member 60 may be securely fastened to the upper end of the pipe 61. The clamping member 60 is insulated from the pipe 61 by an insulating member 63 having a cylindrical portion which is disposed between the pipe and the collar 60d, and a flange portion which is disposed between the upper end of the pipe and the horizontal portion 60a of the member 60. The lug 60c is provided with a groove 60e which receives a portion of the wire P below its non-insulated upper end Pa, and the T-shaped portion 60b is provided in one side thereof with a groove 60f which aligns axially with, and forms a continuation of, the groove 60e, and which receives the non-insulated upper end of the wire Pa. The upwardly extending T-shaped portion 60a is also provided in its opposite sides with horizontally extending grooves 60j which receive the two wires of a rail connector RC.

Figure 6F:
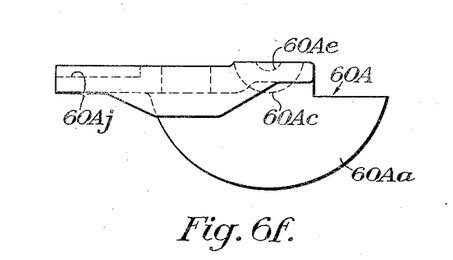
Fig. 6f is a top plan view of the clamping member 60A forming part of the bootleg shown in Figs. 6, 6a, and 6b.
Figure 6G:
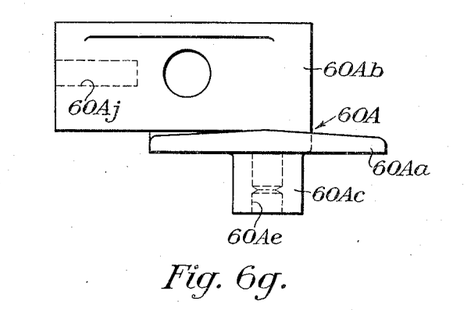
Figs. 6g and 6h are front and side elevational views, respectively, of the clamping member 60A shown in Fig. 6f.
Figure 6H:
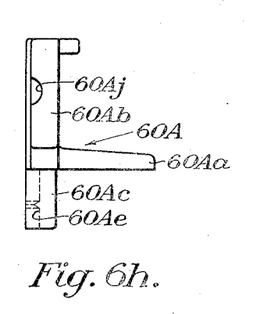

The clamping member 60A comprises a semi-cylindrical horizontal lower portion 60Aa (see Figs. 6f, 6g, and 6h) which closes that portion of the pipe 61 which is not closed by the horizontal portion 60a of the member 60, a vertical portion 60Ab which is formed integral with the horizontal portion 60Aa, and a depending lug 60Ac which is also formed integral with the horizontal portion 60Aa. The lug 60Ac is provided with a groove 60Ae which mates with the groove 60e in the lug 60c of the member 60, while the vertical portion 60Ab is provided with a groove 60Aj which mates with the groove 60j in the T-shaped upper portion 60b of the member 60.

The clamping member 66 has a groove 66j in one side thereof which mates with the adjacent groove 60j in the side of the T-shaped upper portion 60b of the member 60. The three clamping members are securely fastened together by a single clamping bolt 62, which, when tightened, causes the wire P and the two wires of the rail connector RC to be firmly secured in their respective grooves, and also causes the wire P to have good electrical contact with the clamping members and with the wires of the rail connector.

Figures 7, 7A:
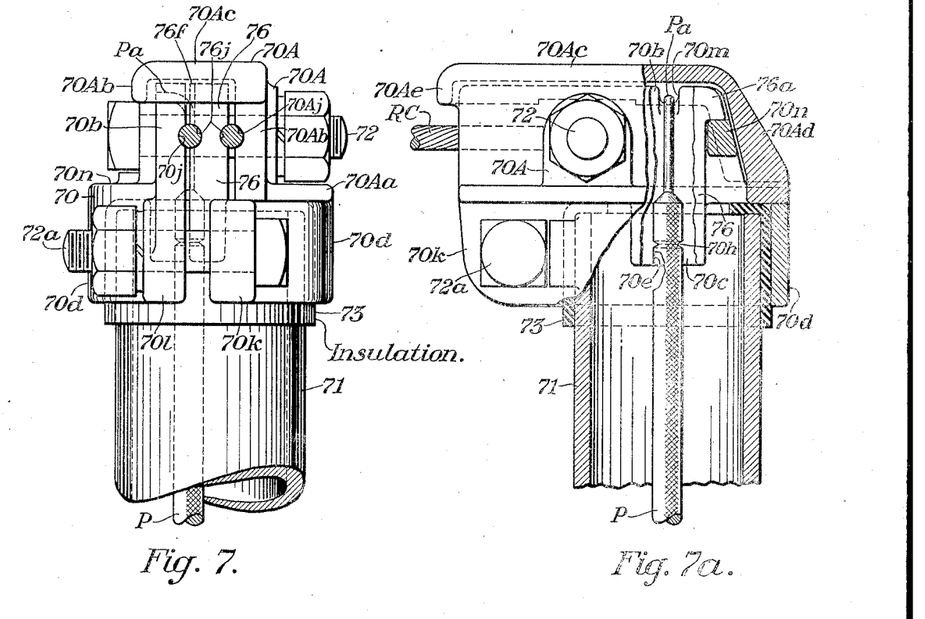
Fig. 7 is a front elevational view showing a seventh form of bootleg embodying my invention.
Fig. 7a is a side view, partly in section and partly in elevation of the bootleg shown in Fig. 7, certain of the parts being broken away or removed to better illustrate the construction of the remaining parts.
Figure 7B:
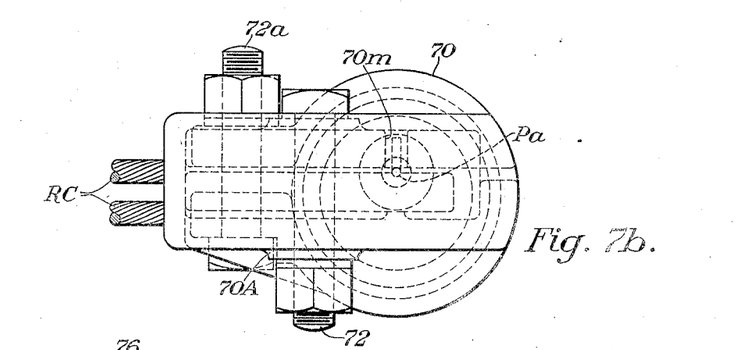

Referring now to Figs. 7, 7a, and 7b, the bootleg in the form here shown comprises a pipe 71 similar to those shown in Figs. 4, 5, and 6, provided at its upper end with a head assembly consisting of three clamping members 70, 70A, and 76. The clamping member 70 is similar to the clamping member 60 of the bootleg shown in Figs. 6, 6a, and 6b with the exception that the horizontal portion 70a (see Fig. 7d) covers a smaller portion of the top of the pipe 71 than the portion 60a of the member 60 covers of the top of the pipe 61, and the vertical portion 70b thereof, instead of being T-shaped, is made straight and is provided in its upper surface with a notch 70m, and at one end with a lug 70n. The clamping member 70 is secured to the pipe 71 by means of a bolt 72a which passes through apertured lugs 70k and 70l provided on the ends of the split collar 70d, and is insulated from the pipe by an insulating member 73 similar to the insulating member 63. The notch 70m is adapted to receive the bent upper non-insulated end Pa of the wire P in the manner shown in Fig. 7a, whereby the wire may be suspended from the head assembly before the other clamping members are bolted in place, and the depending lug 70c of the member 70 is provided with a groove 70e which extends downwardly below the notch 70m and receives a portion of the wire P from which the insulation has not been removed. The groove 70e is provided with a rib 70h which partly closes this groove, the groove 70e and the rib 70h being similar to the corresponding grooves and ribs shown in the preceding views. The vertical portion 70b of the member 70 is further provided in its inner face with a groove 70j for the reception of one of the wires of a rail connector RC, as will be apparent from an inspection of the drawings.

Figure 7C:
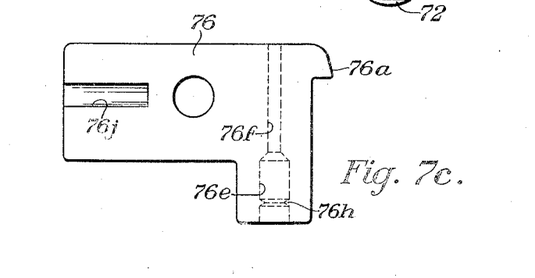
Fig. 7c is a side view of the clamping member 76 forming part of the bootleg shown in the preceding views as this clamping member appears when viewed from the right in Fig. 7.
Figure 7D:
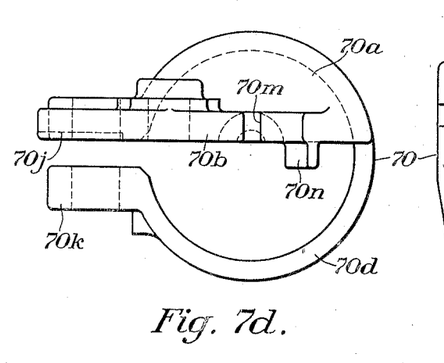
Fig. 7d is a top plan view of the member 70 forming part of the bootleg shown in Figs. 7, 7a, and 7b.
Figure 7E:
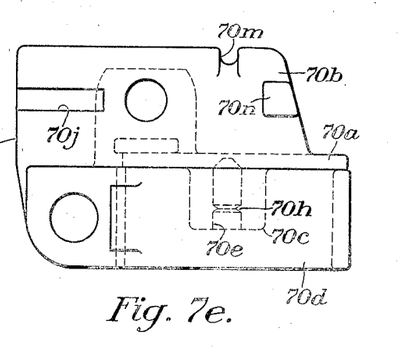
Figs. 7e and 7f are front and side elevational views, respectively, of the member 70 shown in Fig. 7d.
Figure 7F:
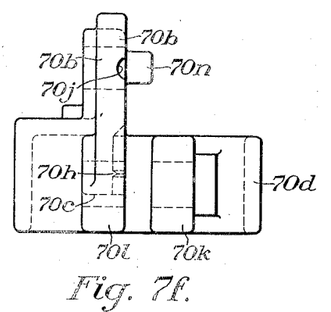

The clamping member 76 is preferably constructed of bronze and is disposed adjacent the grooved face of the vertical portion 70b of the clamping member 70. Formed in the face of the member 76 which is contiguous to the grooved face of the vertical portion 70b are grooves 76e and 76j which are similar to, and which mate with, the grooves 70e and 70j, respectively, in the portion 70a in the manner shown. The clamping member 76 is also provided in the face which is contiguous to the grooved face of the vertical portion 70b of the clamping member 70 with a third groove 76f which forms a continuation of the groove 76e and which receives the non-insulated upper end Pa of the wire P. The groove 76e is partly closed by a rib 76h which is similar to, and mates with, the rib 70h in the groove 70e. During assembly of the parts, the one end of the clamping member 76 rests on the top surface of the lug 70k, while the other end is supported by an integral projection 76a which rests on the lug 70n. The face of the member 76a opposite to that which is provided with the grooves 76e, 76f, and 76j is provided with another groove 76j which receives the remaining wire of the rail connector RC.

Figure 7G:
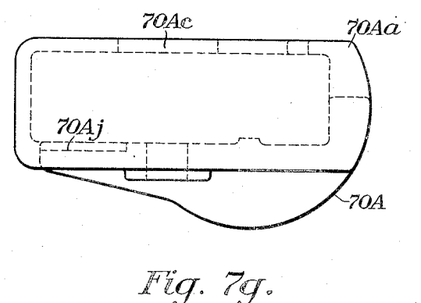
Figs. 7g, 7h, and 7i are top plan, front, and side elevational views, respectively, of the member 70a forming part of the bootleg shown in Figs. 7, 7a, and 7b.
Figure 7H:
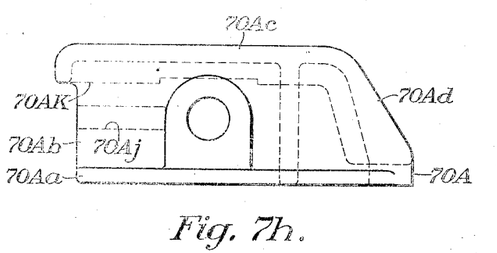
Figure 7I:
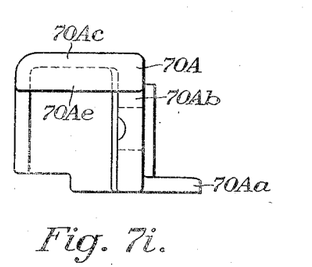

The clamping member 70A comprises a vertical portion 70Ab (see Figs. 7g, 7h, and 7i) which is disposed adjacent the face of the clamping member 76 which is opposite to the face which cooperates with the wire P, a lower integral horizontally extending portion 70Aa which closes the portion of the top of the pipe 71 which is not closed by the other clamping members, and an upper horizontally extending portion 70Ac which projects over the top of the clamping member 76 and the top of the vertical portion 70b of the clamping member 70. The vertical portion 70Ab of the member 70A is provided with a groove 70Aj which mates with the groove 76j in the adjacent face of the member 76. The three clamping members are secured together by means of a bolt 72 which passes through aligned holes in the member 76 and the vertical portions 70b and 70Ab of the clamping members 70 and 70A, and it will be apparent that when the bolt 72 is tightened the one wire of the rail connector RC and the wire P will be rigidly secured between the vertical portion 70a of the clamping member 70 and the clamping member 76, while the other wire of the rail connector will be rigidly secured between the clamping member 76 and the vertical portion 70Ab of the clamping member 70A.

It should be noted that the upper horizontal portion 70Ac of the member 70 is rectangular in shape, and that the one end of this horizontal portion is connected with the lower portion 70Aa by a tapered portion 70Ad. The reason for constructing the member 70A in this manner is to reduce to a minimum the liability of damage due to dragging railway equipment.

It should also be noted that the upper horizontal portion 70Ac of the member 70 is provided at its free edges with downwardly extending lips 70Ak and 70Ae which prevent the direct entrance of water into the pipe between the clamping members, but that, sufficient clearance is provided between the two clamping members 70 and 70A to allow for sufficient ventilation to prevent the condensation of moisture inside of the pipe 71.

One advantage of the bootleg shown in Figs. 7, 7a, and 7b is that the wire P can be loosely hooked in its final position in the bootleg assembly after the member 70 is clamped in place on the post 71, and as a result less slack is required in the wire P than is required in those forms of the bootleg in which the wire P has to be fastened in place before the head assembly is secured to the associated pipe.

Although I have herein shown and described only a few forms of railway bootlegs embodying my invention, it is understood that various changes and modifications may be made therein within the scope of the appended claims without departing from the spirit and scope of my invention.

Having thus described my invention, what I claim is:

1. A bootleg for connecting an insulated electrical conductor with a rail connector comprising a housing projecting upwardly from the ground and enclosing the conductor, said conductor having a portion of the insulation removed from its upper end, a metal member secured to but insulated from said housing and provided with two adjoining axially aligned substantially semicircular grooves one for receiving the bare portion of said conductor and the other for receiving the insulated portion of the conductor immediately below the bare portion, said metal member also being provided with a third groove for receiving one end of said rail connector, and a second metal member bolted to said first member and cooperating with said conductor and said conductor to clamp said conductor and said connector in their associated grooves, said other groove being provided with a rib which partly closes the groove and which becomes embedded in the insulation of said conductor.

2. A bootleg for connecting an insulated electrical conductor with a track rail connector comprising a housing projecting upwardly from the ground and enclosing the conductor, a first metal member supported by the upper end of said housing but insulated therefrom and having grooves therein extending parallel to the axis of said housing for receiving the bare upper end and adjacent insulated portion of said conductor and having other grooves therein extending at right angles to the axis of said housing for receiving the ends of the wires of a rail connector, and means including a second member having grooves therein which are similar to and which mate with the grooves in said first member for mechanically and electrically connecting all of said wires together.

3. A bootleg for separately connecting two insulated electrical conductors with two rail connectors comprising a housing projecting upwardly from the ground and enclosing the conductors, first and second metal members secured to but insulated from the upper end of said housing and from each other, each of said first and second members being provided with a first vertically extending groove for receiving a portion of the upper end of one of said conductors from which the insulation has been removed, with a second axially aligned groove which joins the lower end of said first groove and which receives an insulated portion of the adjacent conductor directly below the non-insulated portion, and with a third groove which extends at right angles to said first groove and which receives one end of one of said rail connectors, and separate clamping means for clamping said conductors and said connectors in the associated grooves.

4. A bootleg for separately connecting two insulated electrical conductors with two rail connectors comprising a housing projecting upwardly from the ground and enclosing the conductors, first and second metal members secured to but insulated from the upper end of said housing and from each other; each of said first and second members being provided with a first vertically extending groove for receiving a portion of the upper end of one of said conductors from which the insulation has been removed, with a second axially aligned groove which joins the lower end of said first groove and which receives an insulated portion of the adjacent conductor directly below the non-insulated portion, and with a third groove which extends at right angles to said first groove and which receives one end of one of said rail connectors; and third and fourth members separately secured to said first and second members adjacent the grooved portions of said first and second members and each provided in its inner face with first, second, and third grooves which are similar to and mate with the correspondingly designated grooves in the adjacent member, the parts being so proportioned that said connectors and said conductors are securely clamped within the associated grooves.

5. A bootleg for connecting a pair of conductors with the two wires of a rail connector comprising a tubular housing projecting upwardly from the ground and enclosing the conductor, said housing being provided at its upper end with a vertical lug which projects upwardly from the housing, a first metal member having a vertical portion disposed adjacent one side of said lug and a horizontal portion which closes the upper end of said housing on said one side of said lug, the horizontal portion of said first member being provided with a pair of holes through which said conductors are brought out of said housing, a first bolt extending through the vertical portion of said first member and said lug for securing said first member to said housing, means for insulating said first member from said housing and said bolt, second and third members secured to the vertical portion of said first member at the outer side thereof by means of a second bolt passing through the members, said second member and the vertical portion of said first member being provided in their contiguous faces with mating grooves which form a continuation of the holes in the horizontal portion of said first member and which receive both an insulated and a non-insulated portion of each conductor in such manner that when said second bolt is tightened both the insulated and non-insulated portions will be firmly clamped in their respective grooves, and said second and third members being provided in their contiguous faces with mating grooves which extend at right angles to the axis of said housing and which receive the wires of said rail connector in such manner that when said second bolt is tightened said wires will be securely clamped in the associated grooves.

6. A bootleg for connecting a pair of electric conductors with a rail connector comprising a tubular housing which encloses the conductors and which has a centrally disposed lug projecting from opposite walls at one end of said housing, a member of insulating material covering the end of said housing and also said lug, similar metal head members arranged on opposite sides of said lug, means for holding said head members in fixed relation to said lug; and means for securing said conductors in passages formed in the lower portions of said head members and in said insulating material and for securing said rail connector to said head members.

7. A bootleg for connecting an insulated electrical conductor with a rail connector comprising a housing projecting upwardly from the ground and enclosing the conductor; a first metal member secured to but insulated from said housing, said first member being provided with a first groove which extends parallel to the axis of said housing and receives a portion of the upper end of said conductor from which the insulation has been removed, with a second axially aligned groove which joins the lower end of said first groove and receives an insulated portion of said conductor directly below the non-insulated portion, and with a third groove which extends at right angles to said first and second grooves and receives one end of said rail connector, and a second metal member secured to said first member adjacent the grooved portion thereof and acting to clamp said conductor and said connector in the associated grooves, said other groove being provided with a rib which partly closes the groove and which becomes embedded in the insulation of said conductor to firmly hold the conductor in place for a distance below the bare portion, whereby the danger of breakage of the conductor at its point of connection with said metal members is materially reduced.

8. A bootleg for connecting an insulated electrical conductor with a track rail connector comprising a housing projecting upwardly from the ground and enclosing the conductor, a first metal member secured to but insulated from the upper end of said housing and having axially aligned adjoining grooves therein extending parallel to the axis of said housing for receiving the bare upper end and adjacent insulated portion of said conductor and having another groove therein extending at right angles to the axis of said housing for receiving one end of said rail connector, and means including a second member having grooves therein which are similar to and which mate with the grooves in said first member for mechanically and electrically connecting all of said wires together, the grooves in said two members which receive the insulated portion of said conductor being provided with ribs which partly close the groove and which become embedded in the conductor to firmly hold it in place for a distance below the bare portion thereof, whereby the danger of breakage of the conductor at its point of connection with said metal members is materially reduced.

9. A bootleg for connecting an insulated electrical conductor with a rail connector comprising a housing projecting upwardly from the ground and enclosing the conductor, said conductor having a portion of the insulation removed from its upper end, a metal member secured to but insulated from said housing and provided with two adjoining axially aligned grooves one for receiving the bare portion of said conductor and the other for receiving the insulated portion of the conductor immediately below the bare portion, said metal member also being provided with a third groove for receiving said rail connector, means for clamping said conductor and said connector in their associated grooves, said other groove being provided with a rib which partly closes the groove and which becomes embedded in the insulation of said conductor to firmly hold said conductor in place for a distance below the bare portion whereby the danger of breakage of said conductor at its point of connection with said metal member is materially reduced.

10. A bootleg for connecting an insulated electrical conductor with a rail connector comprising a housing projecting upwardly from the ground and enclosing the conductor, said conductor having a portion of the insulation removed from its upper end, a member secured to but insulated from said housing and having grooves therein extending parallel to the axis of said housing for receiving the bare upper end and adjacent insulated portion of said conductor and having another groove therein extending at right angles to the axis of said housing for receiving said rail connector, and means for securely clamping said conductor and said rail connector in their associated grooves in a manner to mechanically and electrically connect them together, the groove in said member which receives the insulated portion of said conductor being provided with a rib which partly closes the groove and which becomes embedded in the insulation of said conductor to assist in securing said conductor in place, whereby the danger of breakage of said conductor at its point of connection with said metal member is materially reduced.

HERBERT L. BONE.